United States Patent
Kim et al.

(10) Patent No.: US 10,115,525 B2
(45) Date of Patent: Oct. 30, 2018

(54) ELECTRONIC COMPONENT

(71) Applicant: SAMSUNG ELECTRO-MECHANICS CO., LTD., Suwon-si, Gyeonggi-do (KR)

(72) Inventors: Jong Hoon Kim, Suwon-si (KR); Ha Jung Song, Suwon-si (KR); Jong Ho Lee, Suwon-si (KR); Ki Yong Lee, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/668,136

(22) Filed: Aug. 3, 2017

(65) Prior Publication Data

US 2018/0174755 A1 Jun. 21, 2018

(30) Foreign Application Priority Data

Dec. 20, 2016 (KR) .......................... 10-2016-0174913

(51) Int. Cl.
 *H01G 4/30* (2006.01)
 *H01G 4/232* (2006.01)
 *H01G 4/248* (2006.01)

(52) U.S. Cl.
 CPC ............ *H01G 4/30* (2013.01); *H01G 4/232* (2013.01); *H01G 4/248* (2013.01)

(58) Field of Classification Search
 CPC ........... H01G 4/30; H01G 4/232; H01G 4/248
 See application file for complete search history.

(56) References Cited

U.S. PATENT DOCUMENTS

| | | | | |
|---|---|---|---|---|
| 7,298,603 | B2 * | 11/2007 | Mizuno | H01G 4/005 29/25.42 |
| 9,812,260 | B2 * | 11/2017 | Fukunaga | H01G 4/30 |
| 2003/0170432 | A1 * | 9/2003 | Kobayashi | H01G 4/30 428/209 |
| 2004/0233612 | A1 * | 11/2004 | Sugimoto | H01G 4/12 361/312 |
| 2005/0094350 | A1 * | 5/2005 | Kobayashi | H01G 4/12 361/306.3 |
| 2011/0141655 | A1 * | 6/2011 | Jeong | H01G 4/005 361/303 |
| 2011/0141660 | A1 * | 6/2011 | Jeong | H01G 4/12 361/321.4 |

(Continued)

FOREIGN PATENT DOCUMENTS

| | | |
|---|---|---|
| KR | 10-1565645 B1 | 11/2015 |
| KR | 10-2015-0136820 | 12/2015 |

*Primary Examiner* — Dion R Ferguson
(74) *Attorney, Agent, or Firm* — McDermott Will & Emery LLP

(57) ABSTRACT

An electronic component includes a body including a capacitance portion having dielectric layers formed of a dielectric material, internal electrodes and a cover portion covering at least one surface of the capacitance portion, the cover portion including cover layers formed of a dielectric material, the cover portion including a plurality of first and second cover layers that are stacked alternately, and an external electrode disposed on the body, the external electrode connected to the internal electrodes, wherein average diameters of dielectric grains included in the first and second cover layers are different from each other.

12 Claims, 4 Drawing Sheets

(56) References Cited

U.S. PATENT DOCUMENTS

| | | | |
|---|---|---|---|
| 2012/0262840 A1* | 10/2012 | Koizumi | H01G 4/1209 |
| | | | 361/321.2 |
| 2014/0022692 A1* | 1/2014 | Yoon | H01G 4/12 |
| | | | 361/301.4 |
| 2014/0301013 A1* | 10/2014 | Kim | H01G 4/012 |
| | | | 361/301.4 |
| 2015/0016015 A1 | 1/2015 | Lee et al. | |
| 2015/0016017 A1* | 1/2015 | Park | C04B 35/4682 |
| | | | 361/301.4 |
| 2015/0348712 A1 | 12/2015 | Lee et al. | |
| 2016/0126014 A1* | 5/2016 | Lee | H01G 4/30 |
| | | | 361/301.4 |
| 2017/0271082 A1* | 9/2017 | Yoon | C01G 25/02 |

* cited by examiner

ELECTRONIC COMPONENT

CROSS-REFERENCE TO RELATED APPLICATION(S)

This application claims the benefit of priority to Korean Patent Application No. 10-2016-0174913, filed on Dec. 20, 2016 with the Korean Intellectual Property Office, the disclosure of which is incorporated herein by reference in its entirety.

TECHNICAL FIELD

The present disclosure relates to an electronic component such as a multilayer ceramic capacitor.

BACKGROUND

Small electronic components such as a capacitor, an inductor, a piezoelectric element, a varistor, a thermistor, and the like, generally include a body formed of a dielectric material, internal electrodes disposed in the body, and external electrodes disposed on surfaces of the body to be connected to the internal electrodes. Among them, a multilayer ceramic capacitor has been widely used as an electronic component of a mobile communications apparatus such as a computer, a personal digital assistant (PDA), a cellular phone, or the like, due to advantages such as small size, high capacitance, easy mounting, and the like.

SUMMARY

An aspect of the present disclosure may provide an electronic component capable of having excellent reliability in spite of being thinned and having a high capacitance.

According to an aspect of the present disclosure, an electronic component may be provided, in which cover layers of which sizes of dielectric grains are different from each other or sintering temperatures are different from each other are stacked alternately to configure a cover portion protecting a capacitance portion.

According to an aspect of the present disclosure, an electronic component may include: a body including a capacitance portion including dielectric layers formed of a dielectric material, and internal electrodes and a cover portion covering at least one surface of the capacitance portion and including cover layers formed of a dielectric material; and an external electrode disposed on the body and connected to the internal electrodes, wherein the cover portion includes a plurality of first and second cover layers that are stacked alternately, and average diameters of dielectric grains included in the first and second cover layers are different from each other.

According to another aspect of the present disclosure, an electronic component may include: a body including a capacitance portion including dielectric layers formed of a dielectric material and internal electrodes and a cover portion covering at least one surface of the capacitance portion and including cover layers formed of a dielectric material; and an external electrode disposed on the body and connected to the internal electrodes, wherein the cover portion includes a plurality of first and second cover layers that are stacked alternately, and sintering

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Figure 1:
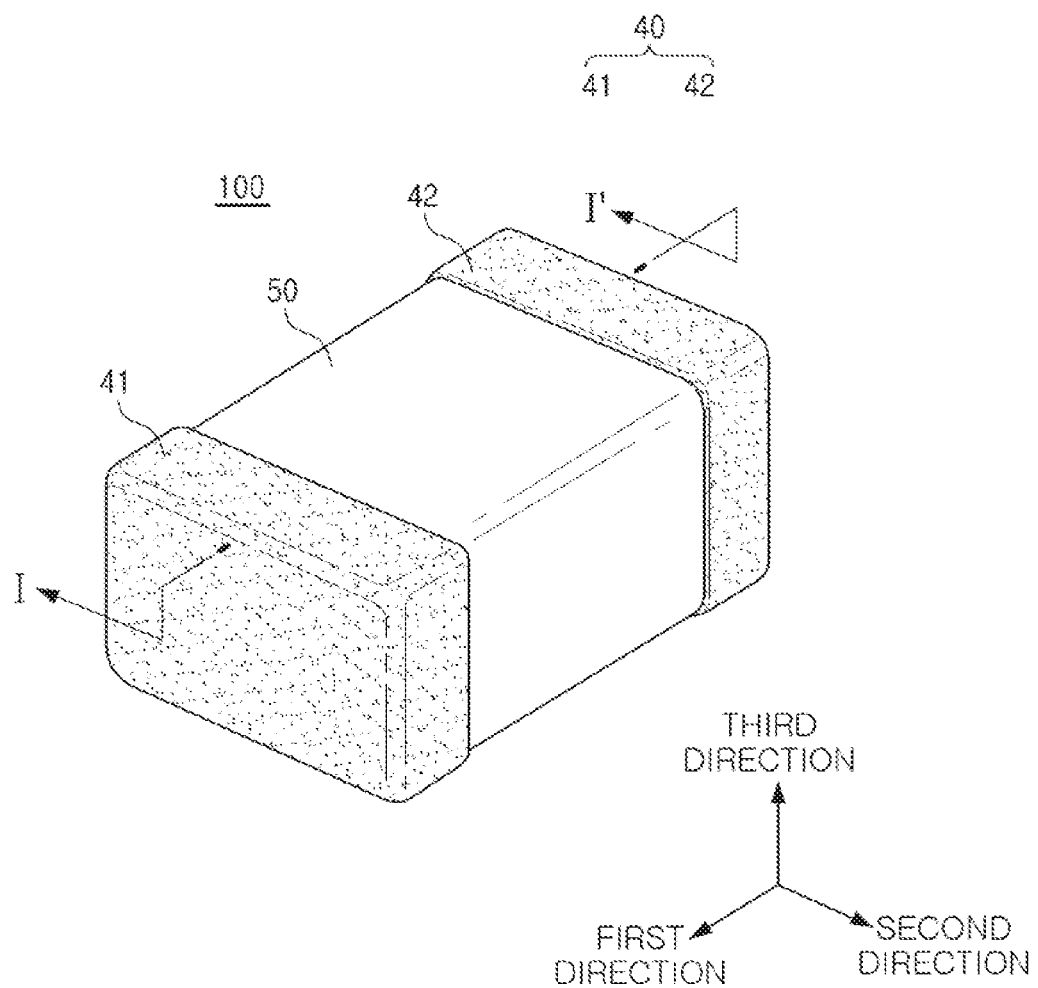
FIG. 1 is a perspective view illustrating an electronic component according to exemplary embodiments of the present disclosure.

Hereinafter, exemplary embodiments of the present disclosure will be described with reference to the accompanying drawings. In the accompanying drawings, shapes, sizes, and the like, of components may be exaggerated or miniaturized for clarity.

Meanwhile, an electronic component will be described on the basis of a structure of a multilayer ceramic capacitor for convenience of explanation. However, the present disclosure is not necessarily limited thereto, but may be applied to small electronic components such as a capacitor, an inductor, a piezoelectric element, a varistor, a thermistor, or the like, in which a crack may occur when they are mounted on a circuit board.

Meanwhile, herein, a side portion refers to a direction toward a first direction or a second direction for convenience, an upper portion refers to a direction toward a third direction for convenience, and a lower portion refers to a direction toward an opposite direction to the third direction for convenience. In addition, a width direction refers to the first direction or the second direction, and a thickness direction refers to the third direction.

Meanwhile, a phrase "positioned at the side portion, the upper portion, or the lower portion" has been used as a concept including a case in which a target component is positioned in a corresponding direction, but does not directly contact a reference component, as well as a case in which the target component directly contacts the reference component in the corresponding direction. However, these directions are defined for convenience of explanation, and the claims are not particularly limited by the directions defined as described above.

Meanwhile, in the present disclosure, the meaning of an "electrical connection" of one component to another component includes a case in which one component is physically connected to another component and a case in which one component is not physically connected to another component. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

In addition, a term "example" used in the present disclosure does not mean a particular exemplary embodiment, but is provided in order to emphasize and describe different unique features. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

In addition, terms used in the present disclosure are used only in order to describe an example rather than limiting the scope of the present disclosure. In this case, singular forms include plural forms unless interpreted otherwise in context.

FIG. 1 is a perspective view illustrating an electronic component according to exemplary embodiments of the present disclosure.

Figure 2:
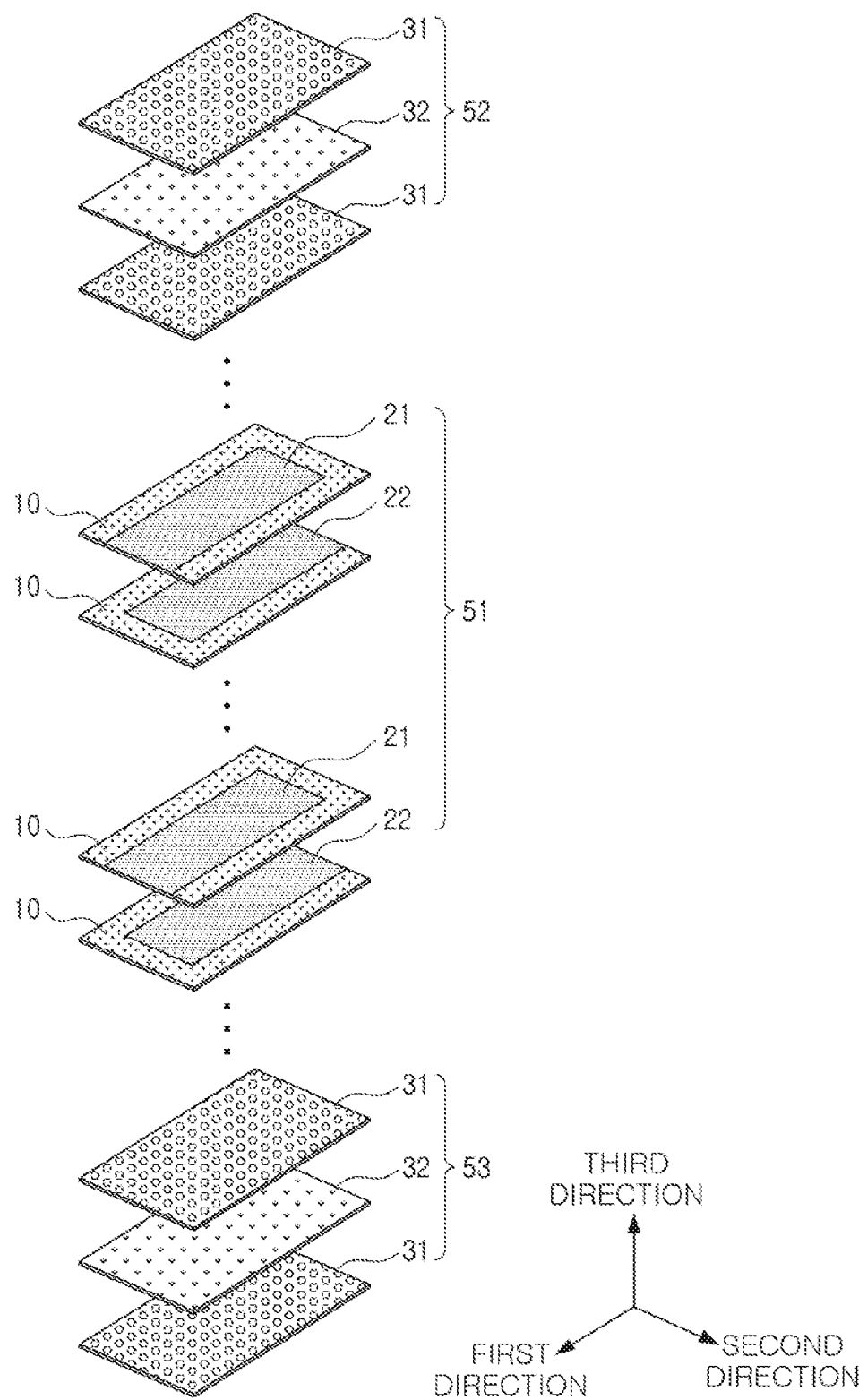
FIG. 2 is an exploded perspective view of the electronic component of FIG. 1.

FIG. 2 is an exploded perspective view illustrating the electronic component of FIG. 1.

Figure 3:
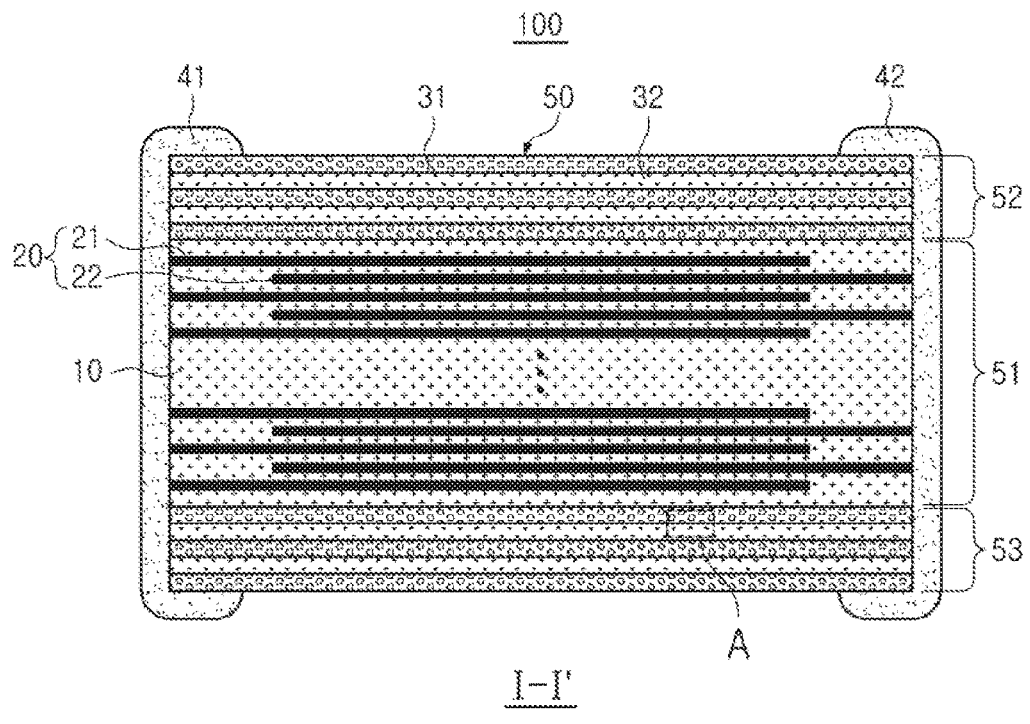
FIG. 3 is a cross-sectional view taken along line I-I' of FIG. 1.

FIG. 3 is a cross-sectional view taken along line I-I' of the electronic component of FIG. 1.

Figure 4:
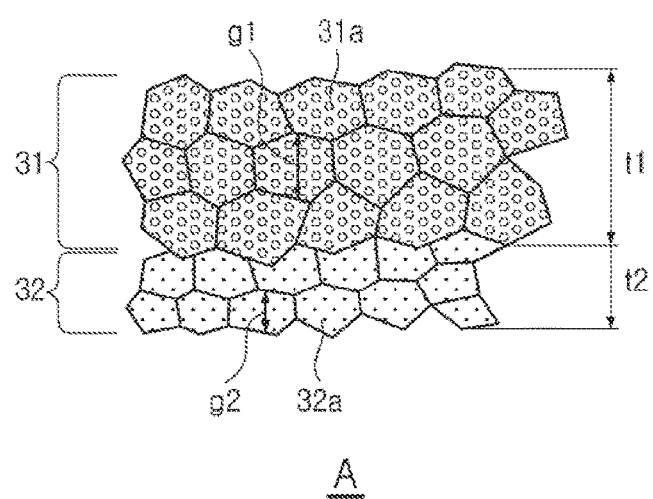
FIG. 4 is an enlarged cross-sectional view illustrating a portion of region A of the electronic component of FIG. 3.

FIG. 4 is an enlarged cross-sectional view illustrating a portion of region A of the electronic component of FIG. 3.

Referring to the drawings, an electronic component 100 according to exemplary embodiments of the present disclosure may include a body 50 including a capacitance portion 51 including dielectric layers 10 formed of a dielectric material, and internal electrodes 20 and first and second cover portions 52 and 53 disposed, respectively, on upper and lower surfaces of the capacitance portion 51, and including cover layers 31 and 32 formed of a dielectric material; and an external electrode 40 disposed on the body 50 and connected to the internal electrodes 20. Each of the first and second cover portions 52 and 53 may include a plurality of first and second cover layers 31 and 32 that are stacked alternately. The first and second cover layers 31 and 32 may be stacked alternately. In this case, average diameters g1 and g2 of dielectric grains 31a and 32a each included in the first and second cover layers 31 and 32 may be different from each other. Therefore, sintering temperatures of the first and second cover layers 31 and 32 may be different from each other.

In order to develop a multilayer ceramic capacitor having an ultra-high capacitance, it has been continuously demanded to, or desirable to form, thin dielectric layers and increase the number of stacked dielectric layers. In addition, thicknesses of a cover and a margin tend to be continuously reduced in order to implement a maximum capacitance in a limited volume. Therefore, an inherent function of a cover portion that should protect a capacitance portion in which internal electrodes are disposed has been weakened. Particularly, a defect of reliability due to a crack between the capacitance portion and the cover portion may increase, and efforts to improve the reliability through a structural change have been made in order to solve such a problem.

It may be appreciated that a difference between a sintering contraction ratio of the capacitance portion in which dielectric layers on which internal electrodes are printed are stacked and a sintering contraction ratio of the cover portion in which dielectric layers on which internal electrodes are not printed are stacked is large when comparing contraction ratios of each position in a process of sintering a multilayer ceramic capacitor with each other. Such a mismatch between the contraction ratios cause different contraction stresses between the capacitance portion and the cover portion. In some cases, a crack may occur between the capacitance portion and the cover portion and cause a problem in reliability. The reason why such a mismatch between the sintering contraction ratios is generated is that in a case of the capacitance portions including the internal electrodes and the dielectric layers, mutual contraction may be restricted due to a difference between sintering temperatures of the internal electrode and the dielectric layer, such that contraction is mainly generated in a thickness direction in which movement of materials is relatively easy as compared to length and width directions, while in a case of the cover portion including dielectric layers having the same sintering temperature, the same contraction is generated in length, width and thickness directions.

On the other hand, in the electronic component 100 according to exemplary embodiments, the average diameters g1 and g2 of the dielectric grains 31a and 32a each included in the first and second cover layers 31 and 32 may be different from each other. When the average diameters of the dielectric grains 31a and 32a constituting the dielectric layers are different from each other, sintering temperatures of the dielectric grains may be different from each other due to a difference between surface areas of the dielectric grains. Therefore, the sintering temperatures of the first and second cover layers 31 and 32 may be different from each other. For example, the average diameter g1 of the dielectric grains 31a of the first cover layer 31 may be greater than the average diameter g2 of the dielectric grains 32a of the second cover layer 32. In this case, the sintering temperature of the first cover layer 31 may be higher than that of the second cover layer 32. However, a dimension relation is not limited thereto. In this case, due to a difference between the sintering temperatures, contraction in the length and width directions may be decreased and contraction in the width direction may be increased to allow sintering contraction of the capacitance portion 51 and sintering contraction of the cover portions 52 and 53 to coincide with each other. Therefore, cracks occurring between the capacitance portion 51 and the cover portions 52 and 53 may be suppressed. Resultantly, the electronic component 100 may have excellent reliability even in a case in which thicknesses of the cover portions 52 and 53 are smaller than that of the capacitance portion 51, that is, in a case in which dielectric layers are thinned and the number of stacked dielectric layers are increased.

The respective components of the electronic component 100 will hereinafter be described in detail.

The body 50 may provide a basic shape of the electronic component 100. A shape of the body 50 is not particularly limited, but may be, for example, an approximately hexahedral shape as illustrated in FIG. 1. For example, the body 50 may have first and second surfaces opposing each other in the first direction, third and fourth surfaces opposing each other in the second direction and connecting the first and second surfaces to each other, and fifth and sixth surfaces opposing each other in the third direction and connecting the first and second surfaces to each other. The body 50 may not have a hexahedral shape having complete straight lines due to sintering contraction of the dielectric layers 10 and the cover layers 31 and 32 in a sintering process, but may substantially have a hexahedral shape. Edges of the body 50 may be rounded by grinding, or the like. The body 50 may include the capacitance portion 51 and the first and second cover portions 52 and 53 disposed, respectively, on the upper and lower surfaces of the capacitance portion 51.

The capacitance portion 51 may include a plurality of dielectric layers 10 formed of a dielectric material. The plurality of dielectric layers 10 may be in a sintered state, and adjacent dielectric layers 10 may be integrated with each other so that boundaries therebetween are not readily apparent. The dielectric layers 10 may be formed of ceramic powders having a high dielectric constant. In this case, the ceramic powder may be, for example, a barium titanate (BaTiO$_3$)-based powder, a strontium titanate (SrTiO$_3$)-based powder, or the like. However, the ceramic powder is not limited thereto, but may also be another ceramic powder.

The capacitance portion 51 may include the internal electrodes 20 embedded in the dielectric layers 10. The internal electrodes 20 may be formed by printing a conductive paste including a conductive metal at a predetermined thickness on each of the plurality of dielectric layers 10, and may be electrically insulated from each other by each of dielectric layers disposed therebetween. The conductive metal may be nickel (Ni), copper (Cu), palladium (Pd), or alloys thereof, but is not limited thereto.

The internal electrodes 20 may include first and second internal electrodes 21 and 22 alternately disposed with each of the dielectric layers 10 interposed therebetween. The first and second internal electrodes 21 and 22 may be disposed with each of the dielectric layers 10 interposed therebetween to be alternately exposed, respectively, through the first and second surfaces of the body 50 opposing each other in the first direction. The first and second internal electrodes 21 and 22 may overlap each other to form a capacitance. Voltages having opposite polarities may be applied to the first and second internal electrodes 21 and 22 through first and second external electrodes 41 and 42 to be described below, respectively. However, such a disposition is only an example, and a disposition of the internal electrodes 20 is not necessarily limited thereto. That is, the internal electrodes 20 may be disposed in various known forms.

Each of the cover portions 52 and 53 may include the plurality of first and second cover layers 31 and 32 that are stacked alternately. The first and second cover layers 31 and 32 may be formed of ceramic powders having a high dielectric constant. In this case, the ceramic powder may be, for example, a barium titanate (BaTiO$_3$)-based powder, a strontium titanate (SrTiO$_3$)-based powder, or the like. However, the ceramic powder is not limited thereto, but may also be another well-known ceramic powder. That is, materials of the first and second cover layers 31 and 32 are not particularly limited. However, the average diameters g1 and g2 of the dielectric grains 31a and 32a each included in the first and second cover layers 31 and 32 may be different from each other. For example, the average diameter g1 of the dielectric grains 31a included in the first cover layer 31 may be greater than the average diameter g2 of the dielectric grains 32a included in the second cover layer 32. The plurality of first and second cover layers 31 and 32 of which the average diameters g1 and g2 of the dielectric grains 31a and 32a are different from each other may be stacked alternately to allow sintering contraction of the cover portions 52 and 53 and sintering contraction of the capacitance portion 51 to coincide with each other, resulting in suppression of, or reduction of, the occurrence of the cracks, or the like.

When the average diameter g1 of the dielectric grains 31a of the first cover layer 31 is greater than the average diameter g2 of the dielectric grains 32a of the second cover layer 32, a thickness t1 of the first cover layer 31 may be greater than a thickness t2 of the second cover layer 32. As described above, when the first cover layer 31 of which the average diameter g1 of the dielectric gains 31a is large has the thickness greater than that of the second cover layer 32 of which the average diameter g2 of the dielectric grains 32a is small and the first cover layers 31 and the second cover layers 32 are stacked alternately, the mismatch between the sintering contraction ratios described above may be more effectively suppressed. However, a difference between the thicknesses is not necessarily limited thereto. That is, in some cases, the first cover layer 31 and the second cover layer 32 may also have approximately the same thickness.

The body 50 may be formed by, for example, applying a slurry including ceramic powders onto carrier films and then drying the applied slurry to prepare a plurality of ceramic green sheets 10, printing a conductive paste including a conductive metal at a predetermined thickness on the respective ceramic green sheets to form the internal electrodes 20, stacking the ceramic green sheets having the internal electrodes 20 formed thereon to form a laminate, stacking ceramic green sheets 31 and 32 on which the internal electrodes 20 are not printed on upper and lower surfaces of the laminate, and then sintering the laminate having the ceramic green sheets 31 and 32 stacked on the upper and lower surfaces thereof, but is not limited thereto.

The external electrode 40 connected to the internal electrodes 20 may be disposed on the body 50. The external electrode 40 may be formed by, for example, applying a conductive paste containing copper (Cu) powders, silver (Ag) powders, or the like, on a surface of the body 50 to form an electrode layer, applying a conductive resin composition to cover the electrode layer, and then hardening the applied conductive resin composition to form an electrode layer. The electronic component 100 may be electrically connected to an external element through the external electrode 40.

The external electrode 40 may include the first and second external electrodes 41 and 42 disposed on the body 50 to be spaced apart from each other. The first and second external electrodes 41 and 42 may be disposed to cover at least the first and second surfaces of the body 50 opposing each other in the first direction, respectively. The first and second external electrodes 41 and 42 may be connected to the first and second internal electrodes 21 and 22, respectively. The voltages having the opposite polarities may be applied to the first and second internal electrodes 21 and 22 through the first and second external electrodes 41 and 42, respectively. However, such a disposition is only an example, and a disposition of the external electrode is not necessarily limited thereto, but may also be modified into a known form.

Figure 5:
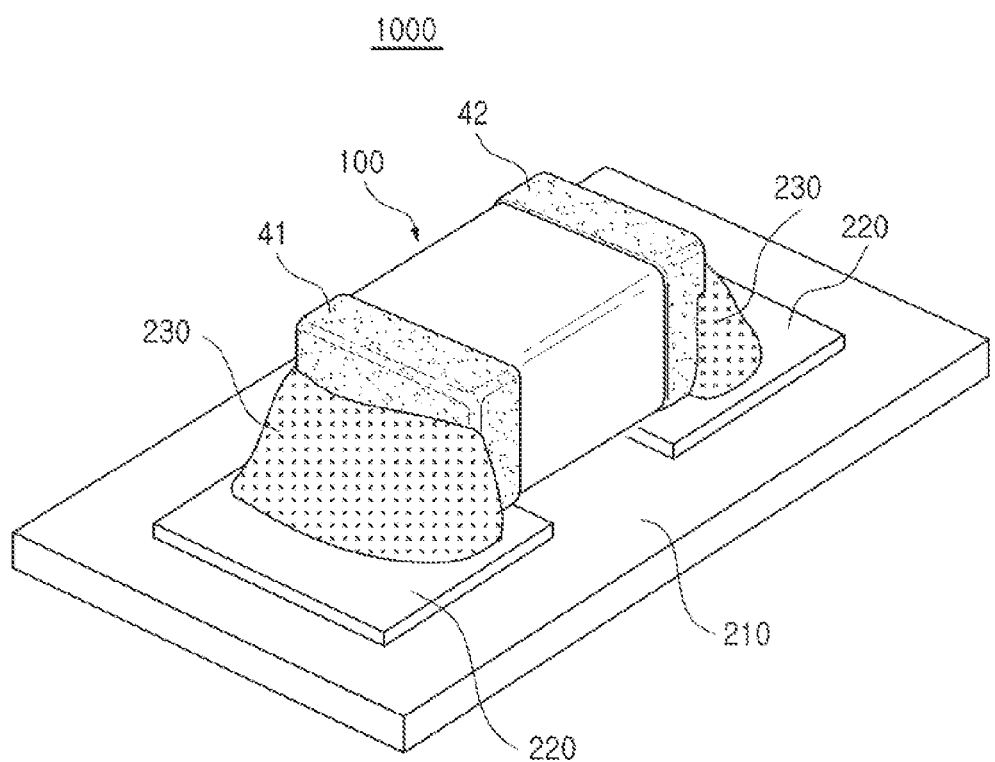
FIG. 5 is a perspective view illustrating a board having an electronic component according to exemplary embodiments of the present disclosure.

FIG. 5 is a perspective view illustrating a board having an electronic component according to exemplary embodiments of the present disclosure.

Referring to the drawing, a board 1000 having an electronic component according to exemplary embodiments of the present disclosure may include a circuit board 210 including a plurality of electrode pads 220 formed thereon to be spaced apart from each other, and the electronic component 100 mounted on the circuit board 210. The first and second external electrodes 41 and 42 disposed on outer surfaces of the electronic component 100 may be soldered and electrically connected to the circuit board 210 by solders 230 in a state in which they are disposed on the electrode pads 220, respectively, to be in contact with the electrode pads 220, respectively.

Meanwhile, only a case in which the internal electrodes 20 of the electronic component 100 are mounted to be disposed horizontally to a mounted surface of the circuit board 210 is illustrated in the drawing, but the internal electrodes 20 are not particularly limited thereto. That is, the internal electrodes 20 may also be mounted to be disposed vertically to the mounted surface of the circuit board 210. In some cases, the electronic component 100 may also be embedded in the circuit board 210.

As set forth above, according to exemplary embodiments of the present disclosure, an electronic component capable of having excellent reliability despite being thinned and having a high capacitance may be provided.

While exemplary embodiments have been shown and described above, it will be apparent to those skilled in the art that modifications and variations could be made without departing from the scope of the present invention as defined by the appended claims.

What is claimed is:

1. An electronic component comprising:
 a body including a capacitance portion having dielectric layers formed of a dielectric material;
 internal electrodes and a cover portion covering at least one surface of the capacitance portion, the cover portion including cover layers formed of a dielectric material, the cover portion including a plurality of first and second cover layers that are stacked alternately; and
 an external electrode disposed on the body, the external electrode connected to the internal electrodes,
 wherein average diameters of dielectric grains included in the first and second cover layers are different from each other.

2. The electronic component of claim 1, wherein the average diameter of the dielectric grains included in the first cover layer is greater than that of the dielectric grains included in the second cover layer.

3. The electronic component of claim 2, wherein a thickness of the first cover layer is greater than that of the second cover layer.

4. The electronic component of claim 1, wherein the cover portion includes:
 a first cover portion disposed on an upper surface of the capacitance portion and a second cover portion disposed on a lower surface of the capacitance portion, and
 each of the first and second cover portions including at least a portion of the first and second cover layers.

5. The electronic component of claim 4, wherein a thickness of the capacitance portion is greater than a thickness of the first and second cover portions.

6. The electronic component of claim 1, wherein the internal electrodes include a plurality of first and second internal electrodes stacked alternately, with at least one of the dielectric layers interposed between the first and second internal electrodes.

7. The electronic component of claim 6, wherein the external electrode includes first and second external electrodes covering, respectively, at least portions of first and second surfaces of the body opposing each other, and
 the first and second internal electrodes are alternately led to the first and second surfaces of the body, respectively, to be thus connected to the first and second external electrodes, respectively.

8. An electronic component comprising:
 a body including a capacitance portion having dielectric layers formed of a dielectric material;
 internal electrodes and a cover portion covering at least one surface of the capacitance portion, the cover portion including cover layers formed of a dielectric material, the cover portion including a plurality of first and second cover layers that are stacked alternately; and
 an external electrode disposed on the body and connected to the internal electrodes,
 wherein sintering temperatures of the first and second cover layers are different from each other.

9. The electronic component of claim 8, wherein average diameters of dielectric grains included in the first and second cover layers are different from each other.

10. The electronic component of claim 9, wherein thicknesses of the first and second cover layers are different from each other.

11. The electronic component of claim 8, wherein a sintering contraction ratio of the cover portion in a thickness direction is greater than that of the cover portion in a length direction and that of the cover portion in a width direction.

12. The electronic component of claim 11, wherein a sintering contraction ratio of the capacitance portion in a thickness direction is greater than that of the capacitance portion in a length direction and that of the capacitance portion in a width direction.

* * * * *